UNITED STATES PATENT OFFICE.

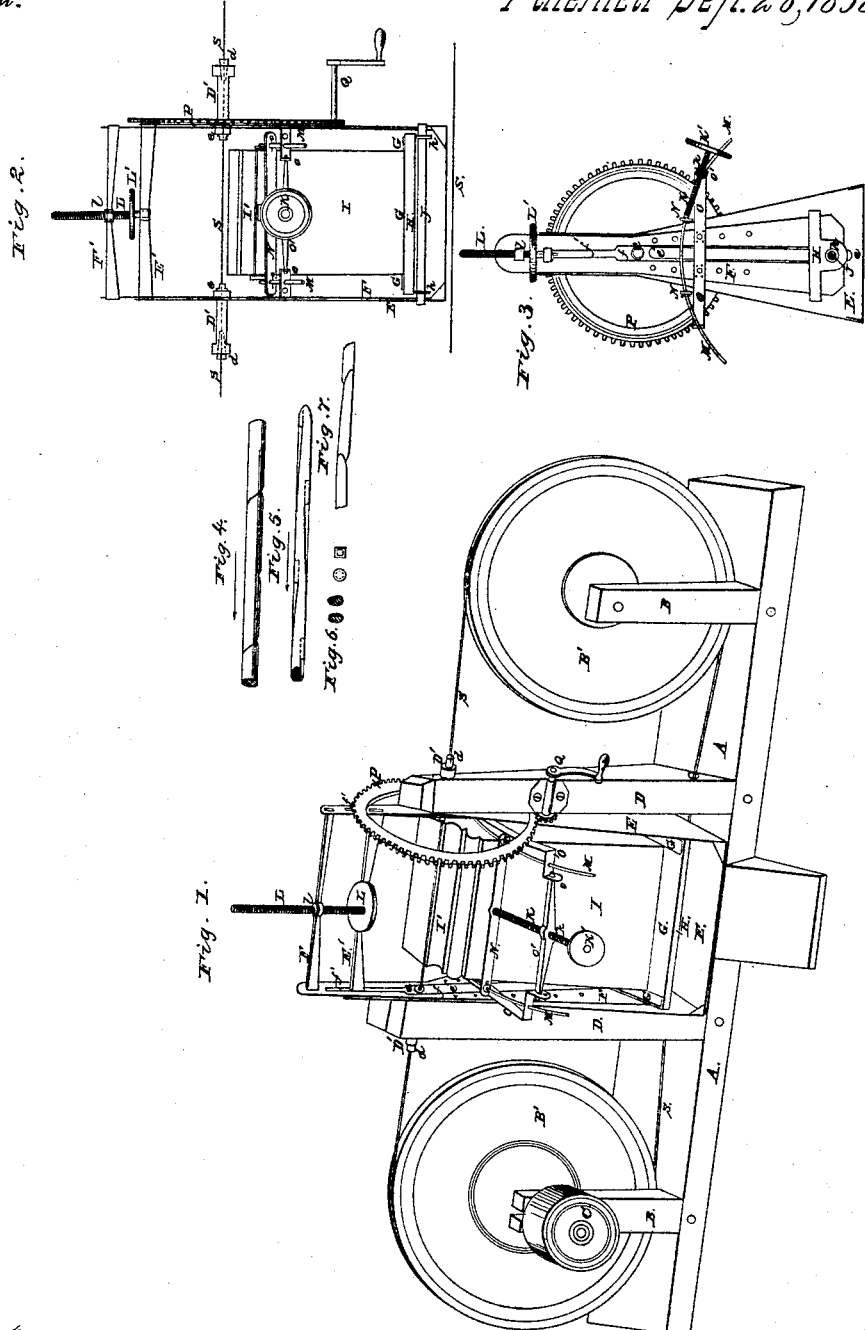

JAMES NORMAN AND AARON R. McLEAN, OF WEST DRESDEN, NEW YORK.

MACHINE FOR SAWING MARBLE, STONE, &c.

Specification of Letters Patent No. 21,622, dated September 28, 1858.

*To all whom it may concern:*

Be it known that we, JAMES NORMAN and AARON R. McLEAN, of West Dresden, in the county of Yates and State of New York, have invented new and useful Improvements in Machines for Sawing Marble and other Stone into Irregular Forms or Shapes; and we do hereby declare that the following is a full, clear, and exact description of the construction and operation of the same, reference being had to the annexed drawings, making a part of this specification, in which—

Figure 1 is a perspective view; Fig. 2 a longitudinal or front elevation of the carriage and stone; Fig. 3 a transverse section of the carriage; Fig. 4 a perspective or side elevation of the saw; Fig. 5 an edge or top view of the saw; Fig. 6 a transverse sectional or end view of the saw in the several forms; and Fig. 7 an edge or bottom view of the saw.

Similar letters refer to corresponding parts in each figure.

To enable others skilled in the art to make and use our invention we will proceed to describe its construction and operation.

Having made the frame A, of any given size to correspond with the work to be done with upright posts D, D, firmly set for holding or sustaining the carriage and its attachments.

B, B, are short upright posts securely set in A. They are for holding the wheels B′, B′. The diameter of these wheels is several feet, with grooves in their face for carrying or driving the saw, S; the wheels may be hung vertically or in a horizontal position; on the axle of one of the wheels B′ may be placed a pulley, C, upon which a belt may be applied for driving the wheels and saw.

D′, D′, are hollow centers or points through which the saw passes. They are so constructed as to form a loose or turning joint with, E. These points are made sufficiently strong to sustain the carriage with the stone placed in it while the same may be rotated around in either direction. They are so arranged that the bushing pieces, d, d, may be replaced readily when worn out. These bushing pieces serve the purpose of guiding or holding the saw in or to the center.

E, is the outside carriage, the width of which is as the distance between the posts D, D. The length is made to suit the work to be done.

e, e, are collars or flanges made on E and on or through which the carriage is supported. They also serve as guide pins on which the slots, f, f, (in F,) can move up or down. It (the carriage E) also has openings or slots e′ e′ in its sides from near the center point to near the lowest part. Their use is to serve as guides for steadying or allowing the rod J as shown in Fig 2 to pass up or down in.

E′ is a beam or crosspiece which serves to connect the top ends of the side pieces and firmly hold them together; in the center of this crosspiece a hole or opening is made for receiving the lower end of the screw rod L. They are joined so as to form a swivel joint. The ends of this beam passes through the small openings or slots f′ f′ in F.

F is the inside portion of the carriage, the two side pieces of which are connected by a beam or crosspiece F′ at the upper end. At the center of this beam is a nut, l, for the screw rod L to pass through. Each side piece of F has an opening or slot, f, which serves as a guide in which the collar e passes, also the small slots f′ which passes the beam E′.

G, G, G, are keys or wedges of wood; their use is to secure the stone in the part H.

H is a bed plate, the use of which is to receive and support the stone; it is made with a flange around the upper side to hold the keys G against, and clamp the stone; on the lower side at opposite ends are projections h, h, as in Fig. 2 with holes for the rod J to pass through, and on which the bed plate H may incline either way to suit the movement of the stone when moved by K. Also to aid in placing the stone in the machine.

I is a stone placed in position in the carriage for sawing.

I′ represents a portion of the stone as having been cut.

J in Fig. 2 is an iron rod secured at or near the bottom of F the ends of which extend through E and work up and down in the slots e′ e′. It also supports the bed plate H and is the center or turning point of motion of the stone given it by K.

K is a screw rod its use is to move the stone backward and forward or give the stone a motion at right angles to that of L.

One end of this screw rod is secured by a swivel joint to the piece N so as to allow it to be moved in either direction. The screw rod passes through the nut, k, in the center of the piece O'.

K' is a hand wheel for moving K.

L is a screw rod used for feeding the stone up or down to the saw (at right angles to that of K). It has its lower end secured by a swivel joint to the crosspiece E' and passes through the nut l which is secured to or in the crosspiece F'.

L' is a hand wheel for operating L.

M, M, are rods bent in the arc of a circle the center of which is J. They pass through the arms O, O and the parts, N, N, N, N, serve as clamps and are placed at the front and back of the stone I. They are secured to the rods M M by pins or nuts. These pieces with the rods surround the stone and by the use of wooden wedges any irregular shaped stone may be securely clamped in the carriage.

O, O, are arms or frames which are bolted upon the inside of F, (the small holes in F, are for bolting these frames upon it and it can be placed up or down to suit the work to be done). The front ends are turned at right angles and have holes in them for receiving and holding the piece O'.

O' is a piece with each end prepared so as when placed in the holes in O, O, they will form a swivel joint, thus making the nut k free to allow of the change produced by shifting the position of the stone laterally; this piece can be easily taken out or put in (also the rods M M and pieces N N,) when it is necessary to place a stone in the carriage.

P is a wheel of spur gear. It is fastened to the part E in such a position that the center of the wheel will be at the center of the hollow centers D' or have the same turning center as the part E.

Q is a crank shaft and pinion which is placed on one of the posts D, the use of which is to rotate the wheel P and thereby cause the carriage (with all its parts and the stone) to be rotated around the saw in either direction, thus enabling us to have the line which we desire to cut (however irregular it may be) always perpendicular to the saw for the purpose of having the sand and water fed downward as in nearly all stone sawing machines.

S, is the saw which is made endless (as a hoop) and of soft iron wire in an ovate, round, square or oval form (see Fig. 6) (as the work to be done may require) with the surface made irregular by indentations, grooves or furrows (in short bold, or long tapering forms) on the sides in nearly a cyma-recta form as shown by Fig. 4. The benefit which these indentations produce is to more effectually carry in and dispose of the sand and water for the cutting operation.

To use our machine place the stone to be cut securely in the carriage, apply the motive power to the wheels, putting them in motion to drive the saw S, then apply the sand and water in the usual manner. To give direction for the cut of the saw, turn the hand wheels K' and L' by which any irregular or regular line may be sawed. As the line varies from a perpendicular use Q for rotating the stone to the desired position which is in a perpendicular form.

What we claim as our invention, and desire to secure by Letters Patent, is—

The carriage as constructed of the parts E, E', and F, F', with the means for holding and adjusting the same, and for holding and adjusting the stone thereon, in combination with the endless saw, when the several parts are constructed and arranged substantialy in the manner, and for the purpose set forth.

JAMES NORMAN.
AARON R. McLEAN.

Witnesses:
CALET GOUNDRY,
JACOB MESEROLE.